PROGRAM SELECTOR

Filed Aug. 10, 1959

MAURICE R. LYNNWORTH
LAWRENCE C. LYNNWORTH
*INVENTORS*

BY Samuel Stree

United States Patent Office 2,944,245

Patented July 5, 1960

2,944,245

PROGRAM SELECTOR

Maurice R. Lynnworth, 2265 62nd St., Brooklyn 4, N.Y., and Lawrence C. Lynnworth, Brooklyn, N.Y. (60 Concord St., Wilmington, Mass.)

Filed Aug. 10, 1959, Ser. No. 832,760

3 Claims. (Cl. 340—162)

This invention relates to program selecting means for indicating a series of timed operations, for instance, selecting a sequence of television channels or radio programs for a predetermined time such as a day or a week.

Quite often many good programs on television are overlooked or forgotten because they are not properly scheduled. With the present device, which may be packaged in a small box and placed on top of a television set, an indicator light for each preselected channel will light at the proper time so that the programs may be tuned in according to the predetermined schedule. Also, an audio alerting signal or buzzer is preferably incorporated. The invention is not limited to selecting television programs, but additional indicator lights may be provided for providing signals for any desired operation at a predetermined time, for instance, times to take medicine, to feed a baby, mealtimes, and so forth.

The invention generally comprises a rotatable drum which is driven by a synchronous motor. The drum has a conductor surface and removable program papers or cards are mounted on the surface. The cards are printed with prescored holes located according to perpendicular coordinates. The coordinate in the direction of the drum surface travel is calibrated in terms of days and hours, and in the direction perpendicular to the time coordinate it is marked for the type of operation, for instance, all the television channels in a certain locality may be set forth. The prescored holes are punched out by the user according to the channel desired at a particular time. A series of contact fingers, one for each channel or type of operation, ride over the card as the drum rotates. When the finger encounters a punched hole, a circuit will be established between the drum and the finger to energize an indicator light for a particular channel together with an audio signal, if desired.

Accordingly, a principal object of the invention is to provide new and improved program selector means.

Another object of the invention is to provide new and improved program selector means for television channels at predetermined times.

Another object of the invention is to provide new and improved program selecting means for timed operations including indicator lights and audio signals.

Another object of the invention is to provide new and improved program selector means which are economic to manufacture and easy to operate.

Another object of the invention is to provide new and improved program selector means which may be easily adapted for fully automatic operation.

Another object of the invention is to provide new and improved program selector means comprising a rotatable drum which is synchronously driven, punched paper removably mounted on the drum, said paper being printed with time coordinates and operation coordinates and a plurality of conductive contact fingers, one for each operation or channel, adapted to ride over the paper on the drum whereby when one of the fingers encounters a punched hole, a certain indicator is energized.

These and other objects of the invention will be apparent from the following specification and drawings, of which:

Figure 1:
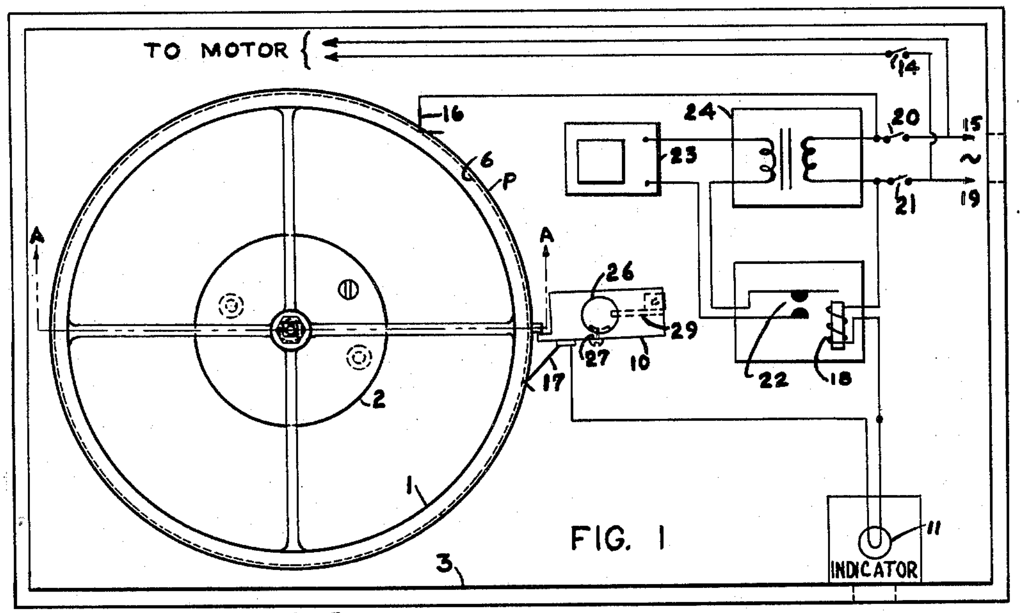
Figure 1 is a plan view of an embodiment of the invention with a schematic circuit.
Figure 2:
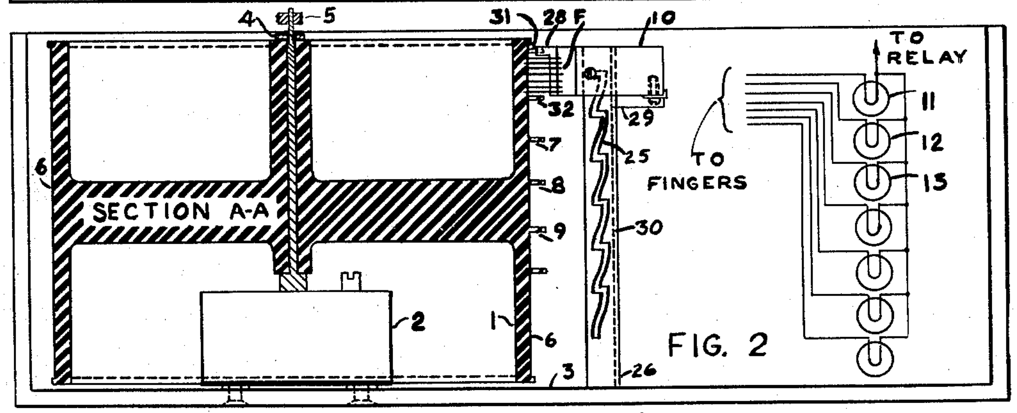
Figure 2 is an elevation view partially in section along line A—A of Figure 1 of the embodiment of Figure 1.

Referring to the figures, the invention generally comprises a drum 1 which may be of ribbed, perforated lightweight plastic or other equivalent material. The drum is rotatably mounted, for instance, on a shaft of a synchronous motor 2 which is mounted on the bottom of the case 3. The drum is caused to rotate with the driving shaft when the lock nut 4 is tightened. The drum is preferably supported at its upper end by a bearing 5 or equivalent support mounted in the top of the case which is preferably removable. The drum has a conductive sheet 6 on its surface and has a plurality of extending pins 7, 8, and 9, the operation of which will be explained herein.

Figure 3:
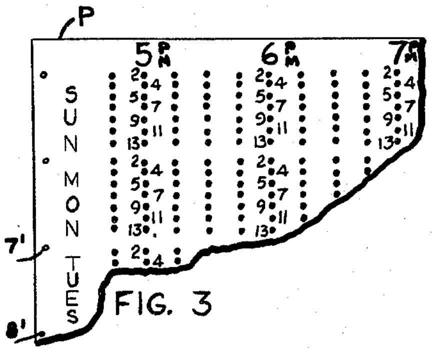
Figure 3 is a detail view illustrating a program card or paper for use with the invention.
Figure 4:
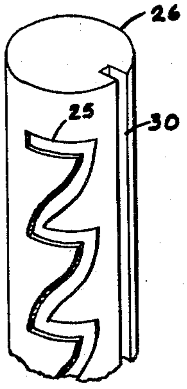
Figure 4 is a perspective detail view of the mounting shaft for the contact fingers.

The program paper or card P is illustrated in Figure 3 and may comprise a series of prescored punched holes which are equally spaced. Time is laid off on one coordinate which when mounted on the drum will be in the direction of the drum surface travel. For instance, as illustrated in Figure 3, the hours 5:00 p.m., 6:00 p.m., and 7:00 p.m., are indicated. The paper P. is printed in the other coordinate according to the type of operation. For instance, in Figure 3 the television channels 2, 4, 5, 7, 9, 11, and 13 are identified. The card of Figure 3 is also designed for more than one day of operation. For instance, the upper part relates to Sunday and immediately below there is a section relating to Monday. To use this card for selecting the programs, the prescored holes are punched out at the proper hours and channels. After opening the front panel of the casing, not shown, the card or paper P is then mounted on the drum where it may be properly located by means of the locating holes 7', 8' and so forth, which are located to fit over the extending pins 7 and 8. The paper may be held in place on the drum with elastic bands placed around the drum near the top or bottom or clips or other equivalent means may be used.

A series of contact fingers F, one for each channel or operation, is mounted on a mounting block 10. Each finger is connected to a separate indicating light 11, 12, 13, and so forth. The mounting block is mounted on suitable mounting means so that the fingers will ride over the card in proper space relation, in other words, the finger for channel 2 will ride over the card along the channel 2 markings thereon. The drum may be calibrated and timed by turning the drum with the motor de-energized so that the proper time on the card lines up with the contact fingers and then energizing the motor by means of the motor switch 14.

The control electrical circuit goes from one electrical terminal 15, to the brush 16, which is always in contact with the conductive surface 6 on the drum, through the conducting surface 6, then through any pre-punched hole in the paper to the finger 17 and then through the indicator light 11 and relay coil 18 back to the other electrical terminal 19. Switch 20 in the electrical line may be the on-off switch and switch 21 may be a safety interlock. When a contact is made, the relay coil causes the contacts 22 to touch each other, thus permitting operation of the audio buzzer 23 which is energized by the transformer 24.

If only a short time is desired to be programmed, the finger mounting block 10 may have a permanent mounting. For instance, if only one day of operation is desired, the motor would be chosen to rotate the drum once every twenty-four hours, and the mounting block 10 for the fingers could be stationary.

However, in the embodiment illustrated, the mounting block 10 is adapted to be moved to seven different positions, one for each day of the week. In order to accomplish this, the mounting block is guided in a sawtooth slot 25 in the vertical shaft 26 by means of the screw or pin 27. Spring 29 on mounting block 10 rides in vertical groove 30 of shaft 26 to properly position and tension the fingers. The mounting block has a protruding lip 28 on its upper surface which is adapted to be contacted by the pin 31 on the drum after one revolution of the drum clockwise in Figure 1 which may be twenty-four hours. When the pin 31 contacts the lip 28 it will rotate the mounting block 10 causing the screw 27 to rotate around to the vertical portion of the slot 25 so that the mounting block will fall by gravity to the next horizontal portion of the slot where it will remain for another twenty-four hours until the pin 32 moves it again.

The present device is designed only as an indicating device. However, it may be easily adapted to provide an output for energizing other control apparatus for completely tuning the television set. This may be done by providing other relay coils, which may be connected in series with each of the indicator lights for providing a signal to choose a particular channel on the television set. If desired, a separate switch may be added in the buzzer circuit to eliminate the audio signal completely or after it has been heard.

Various other arrangements and modifications may be made by those desiring to practice the invention. For instance, the mounting block may be mounted on a motor driven lead screw and the card printed to correspond with the movement of the mounting block. Also, other pickup means may be used instead of the contact fingers. For instance, the card may be provided with punched holes so that the pickup may be done with a photoelectric device or the card or drum may be coated or loaded with magnetic recordings and the pickup device may be a magnetic reading head. Also, the punched card could be made flat and moved past the contact fingers with a planar motion.

Therefore, the present invention provides means for enabling an individual to preselect desired programs and channels. For instance, the entire week of programs may be preselected from the Sunday newspaper and the user will be automatically reminded of all programs that he desires to see. The present invention is not limited to use for indicating television programs but may be used for indicating any program or sequence of operations, for instance, it may be used to turn lights on and off, for air conditioners, safety locks, burglar alarm systems, to turn on furnaces, stoves or the like, or to schedule bells in a school or factory or for other equivalent uses.

We claim:

1. Program selector means comprising a rotatable drum having a conductive surface, synchronous motor means to rotate said drum, punched paper means removably mounted on said drum, said paper being printed with time coordinates in the direction of said drum surface travel and television channel coordinates in the direction perpendicular to said time coordinates, a plurality of conductive contact fingers, one for each television channel, mounted to ride on said drum surface, a source of electricity connected to said fingers, and utilization means connected to said fingers, said fingers being mounted on a movable mounting, a slotted support for said mounting, and pins on said drum adapted to move said mounting to a new position on said slotted support after a predetermined increment of time.

2. Apparatus as in claim 1 wherein said support means is a shaft having a sawtooth slot, said finger mounting having a pin riding in said slot.

3. Apparatus as in claim 2 wherein said utilization apparatus includes an indicator light for each finger and audio indicator means.

References Cited in the file of this patent

UNITED STATES PATENTS

| | | |
|---|---|---|
| 2,431,646 | Kenney | Nov. 25, 1947 |
| 2,576,903 | Imm | Nov. 27, 1951 |
| 2,674,820 | Hansen | Apr. 13, 1954 |
| 2,788,886 | Paulding | Apr. 16, 1957 |
| 2,795,476 | Gould | June 11, 1957 |